United States Patent
Graus et al.

(10) Patent No.: US 9,850,807 B2
(45) Date of Patent: Dec. 26, 2017

(54) INTERNAL COMBUSTION ENGINE

(71) Applicant: GE Jenbacher GmbH & Co OG, Jenbach (AT)

(72) Inventors: Mario Graus, Mils (AT); Francisco Lopez, Innsbruck (AT); Herbert Schaumberger, Muenster (AT); Nikolaus Spyra, Innsbruck (AT)

(73) Assignee: GE Jenbacher GMBH & CO OG, Jenbach (AT)

( * ) Notice: Subject to any disclaimer, the term of this patent is extended or adjusted under 35 U.S.C. 154(b) by 31 days.

(21) Appl. No.: 14/990,104

(22) Filed: Jan. 7, 2016

(65) Prior Publication Data

US 2016/0215683 A1    Jul. 28, 2016

(30) Foreign Application Priority Data

Jan. 23, 2015   (AT) ........................ 28/2015

(51) Int. Cl.
*F02B 19/18*        (2006.01)
*F02P 23/00*        (2006.01)
(Continued)

(52) U.S. Cl.
CPC .............. *F02B 19/18* (2013.01); *F02B 19/10* (2013.01); *F02B 19/108* (2013.01);
(Continued)

(58) Field of Classification Search
CPC .... F02B 19/10; F02B 19/108; F02B 19/1085; F02B 19/12; F02B 19/18; F02D 19/002;
(Continued)

(56) References Cited

U.S. PATENT DOCUMENTS 4,494,507 A * 1/1985 Yasuhara ................ F02D 41/28
                                                                              123/357
4,638,777 A    1/1987 Fanner et al.
(Continued)

FOREIGN PATENT DOCUMENTS

DE    10 2009 012 250        9/2010
JP         H08232664 A       9/1996
(Continued)

OTHER PUBLICATIONS

JP 2001-050113 English Translation Version.*
(Continued)

*Primary Examiner* — John Kwon
*Assistant Examiner* — Johnny H Hoang
(74) *Attorney, Agent, or Firm* — GE Global Patent Operation

(57) ABSTRACT

An internal combustion engine including a pre-chamber connected to a pre-chamber feed conduit for supplying the pre-chamber with a fuel (F), and a main combustion chamber. Fuel (F) in the main combustion chamber can be ignited by an ignition flare which passes from the at least one pre-chamber into the at least one main combustion chamber and which is produced by ignition of fuel (F) in the pre-chamber. At least one valve can be open-loop or closed-loop controlled by an open-loop or closed-loop control device depending on a parameter characteristic of a change in a power produced by the internal combustion engine, and/or by which a pre-chamber fuel flow directed through the pre-chamber feed conduit to the at least one pre-chamber can be at least partially diverted into a volume separate from the at least one pre-chamber.

10 Claims, 1 Drawing Sheet

(51) Int. Cl.
  *F02D 41/30* (2006.01)
  *F02B 19/10* (2006.01)
  *F02M 21/02* (2006.01)
  *F02D 19/02* (2006.01)
  *F02B 19/12* (2006.01)

(52) U.S. Cl.
  CPC ........ *F02B 19/1085* (2013.01); *F02D 19/022* (2013.01); *F02D 41/3005* (2013.01); *F02M 21/0236* (2013.01); *F02M 21/0239* (2013.01); *F02P 23/00* (2013.01); *F02B 19/12* (2013.01); *F02M 21/0275* (2013.01); *Y02T 10/125* (2013.01); *Y02T 10/32* (2013.01)

(58) Field of Classification Search
  CPC ............ F02D 41/3005; F02M 21/0236; F02M 21/0239; F02M 21/0275; F02P 23/00; Y02T 10/125; Y02T 10/32
  USPC ........................ 123/46 A, 275–277, 281, 286
  See application file for complete search history.

(56) References Cited

U.S. PATENT DOCUMENTS

| | | | | |
|---|---|---|---|---|
| 4,644,926 | A * | 2/1987 | Sakurai | F02B 19/165 123/254 |
| 6,289,868 | B1 * | 9/2001 | Jayne | F02M 27/042 123/260 |
| 6,739,289 | B2 * | 5/2004 | Hiltner | F02B 43/10 123/253 |
| 8,365,689 | B2 * | 2/2013 | Gruber | F01P 3/16 123/169 PA |
| 2005/0205050 | A1 * | 9/2005 | Kubo | F02B 17/005 123/260 |
| 2011/0214639 | A1 | 9/2011 | Ishida et al. | |
| 2013/0263820 | A1 * | 10/2013 | Yu | F02B 17/005 123/295 |
| 2015/0028239 | A1 | 1/2015 | Terakado et al. | |
| 2015/0267631 | A1 | 9/2015 | Miyamoto et al. | |

FOREIGN PATENT DOCUMENTS

| | | |
|---|---|---|
| JP | H10184462 A | 7/1998 |
| JP | 2001132505 A | 5/2001 |
| JP | 2003-278570 | 10/2003 |
| JP | 2009-221937 | 10/2009 |
| JP | 2009-299593 | 12/2009 |
| JP | 2009299593 A | 12/2009 |
| JP | 2013-177855 | 9/2013 |
| WO | 2014/147978 | 9/2014 |

OTHER PUBLICATIONS

Unofficial English Translation of Japanese Search Report issued in connection with corresponding JP Application No. 2016005176 dated Nov. 28, 2016.

Unofficial English Translation of Japanese Office Action issued in connection with corresponding JP Application No. 2016005176 dated Dec. 13, 2016.

Austrian Search Report dated Jul. 28, 2015 in corresponding Austrian Patent Application No. 28/2015 (with English translation).

European Search Report dated May 19, 2016 in European Application No. 16 00 0011.

* cited by examiner

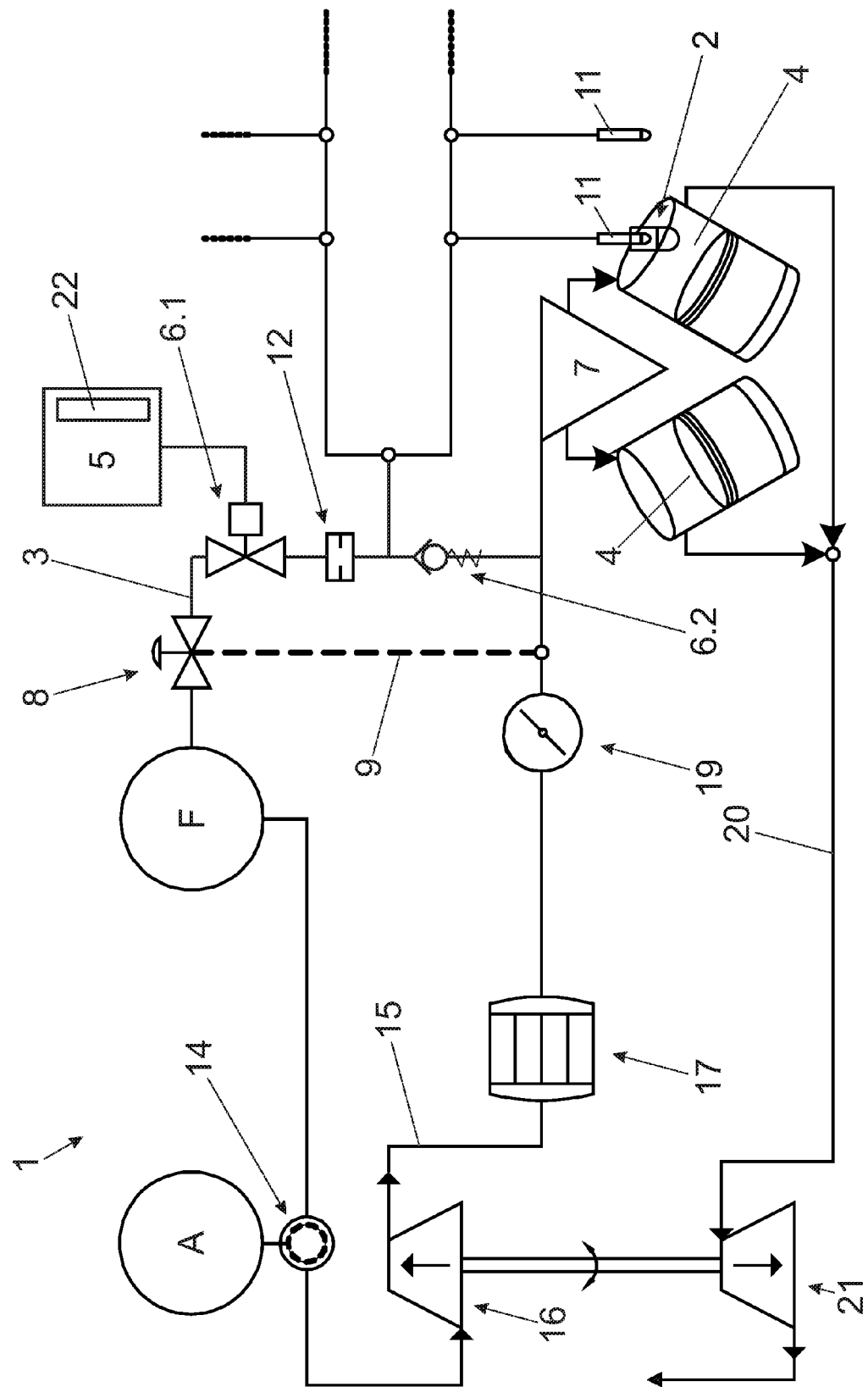

INTERNAL COMBUSTION ENGINE

BACKGROUND OF THE INVENTION

The invention concerns an internal combustion engine and a method of operating an internal combustion engine.

Hereinafter the state of the art will be described by means of the example of a stationary gas engine which drives a generator. They generally have between 10 and 24 cylinders (generally a large whole number) which are each ignited by way of a pre-chamber.

In that respect naturally a rotary speed which is as constant as possible is desirable for the internal combustion engine as a change in rotary speed is translated into a frequency deviation in the case of synchronous generators coupled to the internal combustion engines. DIN ISO 8528-5 sets out what quality classes there are in regard to maximum frequency deviations.

Difficulties therefore occur when relatively large changes in load occur. Various measures are then taken to prevent a change in the rotary speed of the internal combustion engine.

That situation occurs for example in so-called island operation.

If for example the power taken from the generator is abruptly greatly reduced (so-called load rejection) it is necessary to prevent the rotary speed of the internal combustion engine from increasing. That can be effected by reducing the amount of energy fed to the internal combustion engine or for example by closing the throttle valve. That leads to a relatively fast reduction in pressure in the distributor chamber (intake manifold) of the internal combustion engine.

In the case of severe load rejections that rapid reduction in pressure in the intake manifold cannot be sufficiently quickly followed by pressure regulation for the pre-chamber gas feed.

Inaccurate pre-chamber gas metering can lead to unstable combustion processes and thus defective ignition characteristics and deflagration phenomena. The unfavorable pressure differences which occur in that case in a pre-chamber gas feed system as between the pre-chamber system and the intake manifold cylinder of the internal combustion engine can cause defective ignition processes and deflagration phenomena. That makes it difficult to comply with regulatory safety standards.

SUMMARY OF THE INVENTION

The object of the invention is to provide an internal combustion engine and a method of operating an internal combustion engine, which can offer a reduced safety risk in the event of load rejections.

That is effected in that provided at the pre-chamber feed conduit for reducing a pressure difference between a pre-chamber gas feed and the at least one main combustion chamber (4) is at least one valve which can be open-loop or closed-loop controlled by means of an open-loop or closed-loop control device in dependence on a parameter characteristic of a change in a power produced by the internal combustion engine, and/or by means of which a pre-chamber fuel flow directed through the pre-chamber feed conduit to the at least one pre-chamber can be at least partially diverted into a volume separate from the at least one pre-chamber.

A valve according to the invention provides that the pressure conditions in the pre-chamber feed can be more quickly matched to those in the main chamber feed of the internal combustion engine whereby misfires and deflagrations become considerably less probable. In addition there is improved closed-loop control in particular of the rotary speed of the internal combustion engine in the event of load rejections.

Preferably a mixture of air and fuel can be fed to the at least one main combustion chamber. Fuel can preferably be fed to the at least one pre-chamber, in which case a mixture is first produced in the at least one pre-chamber by mixing with the mixture from the at least one main combustion chamber. It is however equally conceivable for a fuel-air mixture also to be fed to the at least one pre-chamber.

The invention can preferably be used in gas engines. The invention can preferably be used in stationary internal combustion engines. Internal combustion engines according to the invention can preferably have between 10 and 24 cylinders (generally a large whole number) as main combustion chambers.

It can be provided that the volume separate from the at least one pre-chamber is an intake manifold of the internal combustion engine. As the excess fuel in the pre-chamber feed in this embodiment can be fed directly to the intake manifold of the internal combustion engine that permits particularly rapid adaptation of the pressure conditions. Alternatively or additionally to the diversion of the pressure into the intake manifold however opening to the environment can equally be provided.

The term intake manifold is used to denote that part of the internal combustion engine which represents the feed of the fuel-air mixture to the at least one main combustion chamber.

In an embodiment in which the pre-chamber fuel flow can be diverted by opening the at least one valve into a volume separate from the at least one pre-chamber, it can preferably be provided that the at least one valve is a non-return valve. Here, to ensure a certain pressure difference between intake manifold and pre-chamber feed it is also possible to use a spring-loaded valve, in particular a non-return valve.

In this embodiment the valve can also be in the form of an open-loop controlled or closed-loop controlled valve.

In a second embodiment it can be provided that a pre-chamber fuel flow directed through the pre-chamber feed conduit to the at least one pre-chamber can be limited—preferably inhibited—by at least partial—preferably complete—blocking of the at least one valve.

It can preferably be provided that the at least one valve can be open-loop or closed-loop controlled by means of the open-loop or closed-loop control device in dependence on a value of a change in load. That value of a change in load, in particular a load rejection, can be provided in various ways for the open-loop or closed-loop control device. If the internal combustion engine is connected to a generator which in turn supplies one or more electrical consumers a drop in load can be detected directly at the consumers and communicated to the open-loop or closed-loop control device.

As however it is usual for internal combustion engines of the general kind set forth to be equipped with sensors for detecting the most widely varying measurement values, it can also be provided that the open-loop or closed-loop control device itself calculates the magnitude of changes in load, in particular load rejections.

It can be provided that a closed-loop pressure control valve or an open-loop pressure control valve is provided in the pre-chamber feed conduit—preferably on a side of the at least one valve, that is remote from the at least one pre-chamber. It can particularly preferably be provided in that case that there is provided a comparing open-loop pressure control valve connected by way of a diaphragm and a breather conduit to the intake manifold of the internal combustion engine.

It is however equally conceivable for a valve according to the invention to be of an integral structure with a closed-loop pressure control valve or open-loop pressure control valve and for it to be open-loop or closed-loop controlled by the open-loop or closed-loop control device.

BRIEF DESCRIPTION OF THE DRAWING

Further advantages and details of the invention will be apparent from the single FIGURE and the specific description relating thereto.

The FIGURE symbolically shows an internal combustion engine 1 according to the invention.

DETAILED DESCRIPTION OF THE INVENTION

That internal combustion engine 1 has cylinders in which the main combustion chambers 4 are arranged. For the sake of clarity however only two main combustion chambers 4 are shown. In this embodiment each of the main combustion chambers 4 is ignited by a pre-chamber 2. That is also shown only in relation to one of the main combustion chambers 4 for the sake of clarity.

The embodiment described here of an internal combustion engine 1 according to the invention can serve to drive a generator for power generation. For the sake of clarity this too is not shown. In general the internal combustion engine 1 can be connected to any load.

There is a fuel source for providing fuel F. Starting therefrom there is a first branch which is substantially formed by the pre-chamber feed conduit 3 and serves for supplying the at least one pre-chamber 2. A second branch is substantially formed by the main mixture feed conduit 15. Disposed at the beginning of the main mixture feed conduit 15 is a mixture preparation device 14 in which a mixture is produced from fuel F and air A. That mixture is then fed to a compressor 16 of a turbocharger. Subsequently arranged in the main mixture feed conduit 15 is a mixture intercooler 17 and a throttle flap 19. The main mixture feed conduit 15 then opens into the intake manifold 7 from which the main combustion chambers 4 are supplied with the compressed cooled fuel-air mixture.

Arranged downstream of the fuel tank in the pre-chamber feed conduit 3 is a comparing open-loop pressure control valve 8. That is connected by way of a breather conduit 9 to the main mixture feed conduit 15 or the intake manifold 7. The open-loop pressure control valve 8 has a spring-loaded diaphragm so that the pressure in the pre-chamber feed conduit 3 is controlled to a pressure with a defined pressure difference in relation to the main mixture feed conduit 15 or the intake manifold 7. The pressure in the pre-chamber gas feed is selected in relation to the feed for the cylinders, at least at that moment in time at which relatively large changes in load occur.

In this embodiment the open-loop pressure control valve 8 is of purely mechanical nature whereby in practice it cannot react sufficiently quickly in the event of rapid changes in load, in particular load rejections, and for some time an excessively high pressure prevails in the pre-chamber feed conduit 3. In addition disposed in the pre-chamber feed conduit 3 is a throttle orifice 12 (referred to as a "gas orifice", even in relation to liquid fuel F it is generally present in gas form at the location of the gas orifice 12).

The valves 6.1 and 6.2 are described somewhat hereinafter.

Downstream of the gas orifice 12 the pre-chamber feed conduit 3 is split into different branches to be able to service each individual pre-chamber 2. That part of the pre-chamber feed conduit 3 is generally referred to as a pre-chamber rail or for brevity just rail. Once again only one of the branches is shown in its entirety in order not to adversely affect clarity of the FIGURE.

The pre-chamber feed conduit 3 or rail is connected to the at least one pre-chamber 2 by way of at least one pre-chamber valve 11. The pre-chamber valves 11 in this case are in the form of passive non-return valves. The above-mentioned slight increased pressure in the pre-chamber feed conduit 3, reduced in defined fashion by the gas orifice 12, provides at the moment in time at which a relatively low pressure prevails in the cylinders, that the valves 11 open and fuel F flows into the pre-chambers.

If there is an excessively high pressure in the pre-chamber feed 3 then too much fuel F flows into the at least one pre-chamber 2 whereby the above-mentioned misfire process is brought about.

That is prevented by the valves 6.1, 6.2, in this case blocking valves. It is to be noted that the two valves 6.1 and 6.2 shown in the FIGURE represent two different designs which can be used in combination but also on their own.

The valve 6.1 is connected to an open-loop or closed-loop control device 5. That device is communicated by way of the interface 22 with characteristic data which point to changes in a power output produced by the internal combustion engine 1. Those characteristic data can be for example measurement data of sensors on the internal combustion engine 1 like charge pressure sensors, cylinder pressure sensors and/or rotary speed sensors. It is also possible for sensors at possible electrical consumers and characteristic data to be communicated to the open-loop or closed-loop control device 5 by way of the interface 22.

If the open-loop or closed-loop control device 5 detects a load rejection the valve 6.1 is caused to block off the pre-chamber feed conduit 3.

The valve 6.1 remains closed until once again more gas is required in the pre-chamber 4. The criterion used can be whether the pressure difference has again settled down into a desired range.

In the specific case the valve 6.1 can be subjected to open-loop control on the basis of a value of a power rejection, that is to say the difference from the power output of the internal combustion engine 1 prior to and after the load rejection. That value is obtained from the signal from a rotary speed sensor (not shown), in which respect the following formula is used:

$$\Delta P = Jw \frac{dw}{dt}$$

In that formula $\Delta P$ denotes the value of the load rejection, J denotes the moment of inertia and w and $$\frac{dw}{dt}$$

denote the angular speed and the derivative thereof.

The valve 6.2 is in the form of a non-return valve. For the purposes of diverting at least a part of the pre-chamber fuel flow into the main mixture feed conduit 15 and thus into the intake manifold 7 there is provided an additional connecting conduit in which the valve 6.2 is disposed. For the purposes of this patent specification the part of that connecting conduit, at the pre-chamber feed side, is considered as part of the pre-chamber feed conduit. Similarly the part of the connecting conduit, that is at the main chamber feed side, is considered as part of the main mixture feed conduit 15.

If in an embodiment of the invention no valve 6.2 is included in such a connecting conduit then the connecting conduit itself is not necessary.

The valve 6.2 which for example is in the form of a non-return valve is spring-loaded in this case in order not to adversely affect the pressure difference between the pre-chamber feed conduit 3 and the main mixture feed conduit 15 which in operation is to be constant. The valve 6.2 is therefore closed off until the pressure difference becomes too great. Then the valve 6.2 opens and pressure equalization occurs.

The configuration of the valve 6.2 in the form of a non-return valve is preferred as that prevents a back flow of the mixture for the cylinders into the pre-chamber gas feed conduit.

Instead of a pre-chamber gas feed which in this embodiment is of a passive kind it is also possible to use an active one.

After combustion of the fuel-air mixture in the cylinders the exhaust gas produced is collected in an exhaust gas conduit 20 and discharged by means of an exhaust system or the like. A turbine 21 of the above-mentioned turbocharger is arranged in the exhaust gas conduit 20. The turbine 21 is connected to the compressor 16 of the turbocharger by a shaft.

The invention claimed is:

1. An internal combustion engine comprising:
    at least one pre-chamber;
    a pre-chamber feed conduit connected to the at least one pre-chamber for supplying an ignition fuel as a pre-chamber ignition fuel feed to the at least one pre-chamber;
    at least one main combustion chamber connected to the at least one pre-chamber wherein a fuel in the at least one main combustion chamber is ignited by ignition of the ignition fuel in the pre-chamber;
    at least one valve arranged in the pre-chamber feed conduit operative for reducing a pressure difference between the pre-chamber ignition fuel feed and the at least one main combustion chamber;
    a non-return valve arranged in the pre-chamber feed conduit operative as needed to at least partially divert the pre-chamber ignition fuel feed into an intake manifold for pressure equalization; and
    a control device operative based on a parameter characteristic of a change in a power produced by the internal combustion engine with a control valve affected by the control device to at least partially block the pre-chamber ignition fuel feed upon occurrence of the parameter characteristic of the change in the power produced by the internal combustion engine.

2. The internal combustion engine as set forth in claim 1, wherein the at least partially diverted pre-chamber ignition fuel feed flows through a main chamber feed conduit and into the intake manifold of the internal combustion engine.

3. The internal combustion engine as set forth in claim 1, wherein the non-return valve is spring-loaded.

4. An internal combustion engine as set forth in claim 1, wherein the pre-chamber ignition fuel feed is completely blocked by the control valve.

5. The internal combustion engine as set forth in claim 1, wherein the control device comprises an interface.

6. The internal combustion engine as set forth in claim 1, wherein the control valve is arranged in the pre-chamber feed conduit downstream of the at least one valve.

7. The internal combustion engine as set forth in claim 6, wherein the at least one valve is connected by way of a breather conduit to the intake manifold of the internal combustion engine.

8. The internal combustion engine as set forth in claim 1, wherein the at least one pre-chamber is connected to the pre-chamber feed conduit by way of at least one respective pre-chamber valve.

9. The internal combustion engine as set forth in claim 8, wherein the at least one pre-chamber valve is a passive non-return valve.

10. A method of operating an internal combustion engine comprising:
    supplying an ignition fuel as a pre-chamber fuel feed to at least one pre-chamber via a pre-chamber conduit;
    igniting a fuel in a main combustion chamber by ignition of the ignition fuel in the at least one pre-chamber;
    reducing a pressure difference between the pre-chamber ignition fuel feed and the main combustion chamber via at least one valve arrange arranged in the pre-chamber feed conduit;
    at least partially diverting the pre-chamber ignition fuel feed into an intake manifold as needed for pressure equalization by using a non-return valve arranged in the pre-chamber feed conduit; and
    affecting a control valve via a control device operative based on a parameter characteristic of a change in a power produced by the internal combustion engine for the affected control valve to at least partially block the pre-chamber ignition fuel feed upon occurrence of the parameter characteristic of the change in the power produced by the internal combustion engine.

* * * * *